(12) United States Patent
Baumert

(10) Patent No.: US 6,784,653 B2
(45) Date of Patent: Aug. 31, 2004

(54) EYE MONITOR

(75) Inventor: Wolfgang Baumert, Schwieberdingen (DE)

(73) Assignee: Alcatel, Paris (FR)

( * ) Notice: Subject to any disclaimer, the term of this patent is extended or adjusted under 35 U.S.C. 154(b) by 238 days.

(21) Appl. No.: 10/192,549

(22) Filed: Jul. 11, 2002

(65) Prior Publication Data

US 2003/0025491 A1 Feb. 6, 2003

(30) Foreign Application Priority Data

Jan. 8, 2001 (EP) ............................................ 01440248

(51) Int. Cl.$^7$ .......................................... G01R 23/167
(52) U.S. Cl. ................... 324/76.28; 375/224
(58) Field of Search ................... 324/76.28; 375/224

(56) References Cited

U.S. PATENT DOCUMENTS

| | | | |
|---|---|---|---|
| 4,449,223 A | 5/1984 | Liskov et al. | |
| 4,475,210 A | 10/1984 | Couch | |
| 4,847,874 A | * 7/1989 | Kroeger et al. | 375/360 |
| 5,333,147 A | 7/1994 | Nohara et al. | |
| 5,736,875 A | 4/1998 | Sakamoto et al. | |
| 6,278,391 B1 | * 8/2001 | Walker | 341/118 |
| 6,282,592 B1 | * 8/2001 | Aston et al. | 710/100 |
| 2002/0060820 A1 | * 5/2002 | Buchall | 359/109 |

FOREIGN PATENT DOCUMENTS

| | | | | |
|---|---|---|---|---|
| EP | 1282256 A1 | * | 2/2003 | ............ H04L/1/20 |
| GB | 2 352 597 A | | 1/2001 | |

OTHER PUBLICATIONS

Buchali F, et al.: "Fast Eye Monitor for 10Gbit/s and its Application for Optical PMD Compensation", OFC 2001, Optical Fiber Communication Conference and Exhibit Technical Digest Postconference Edition, Mar. 17–22, 2001, Anaheim, CA, USA.

Ellermeyer T, et al.: "A 10Gb/s eye Opening Monitor IC for Decision–guided Optimization of the Frequency Response of an Optical Receiver" 2000 IEEE International Solid–State Circuits Conference. Digest Oftechnical Papers, Feb. 7–9, 2000, pp. 50–51, San Francisco.

H. Bulow, et al.: "Adaptation of an Electronic PMD Mitigator by Maximization of the Eye Opening", 26$^{th}$ European Conference on Optical Communications, Sep. 3–7, 2000, Munich, Germany, Proceedings, vol. 3, pp. 209–210.

* cited by examiner

Primary Examiner—Charles H. Nolan, Jr.
(74) Attorney, Agent, or Firm—Sughrue Mion, PLLC

(57) ABSTRACT

An eye monitor for evaluating a binary input signal of a transmission link and for recognizing the edges of an eye diagram of the input signal is described. A decision circuit is provided which is directly connected to an integrator. The input signal and a variable threshold are provided to the decision circuit. An output signal of the integrator is used to recognize the edges of the eye diagram.

7 Claims, 2 Drawing Sheets

EYE MONITOR

BACKGROUND OF THE INVENTION

The invention is based on a priority application EP 01 440 248.1 which is hereby incorporated by reference.

The invention relates to an eye monitor for evaluating a binary input signal of a transmission link and for recognizing the edges of an eye diagram of the input signal. The invention also relates to a corresponding receiver and to a corresponding method.

Such an eye monitor is known from H. Buelow et al., "Adaption of an electronic PMD mitigator by maximization of the eye opening", 26th European Conference on Optical Communication, Sep. 3–7, 2000, Munich, Germany, Proceedings, Volume 3, pages 209–210.

SUMMARY OF THE INVENTION

Figure 1:
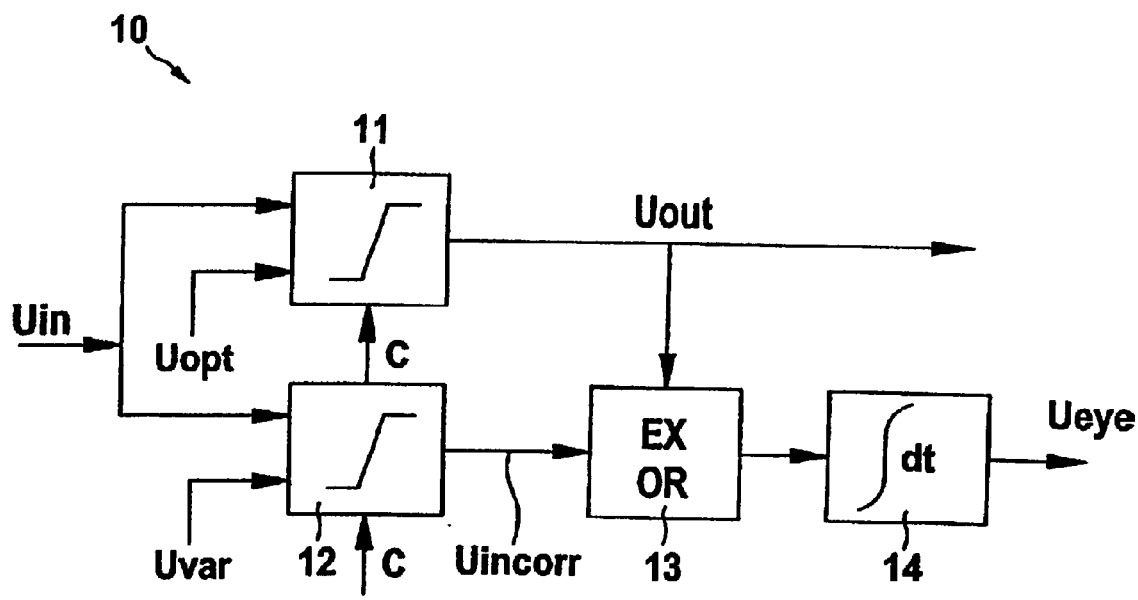

FIG. 1 shows a schematic block diagram of an eye monitor 10 as described in the above prior art document. The eye monitor 10 may be comprised in a receiver of an optical transmission system. The eye monitor 10 receives a binary input signal Uin of a transmission link comprising noise. Due to the noise, the received bits of the input signal Uin may be incorrect which is usually described with the help of a so-called eye diagram.

Figure 2:
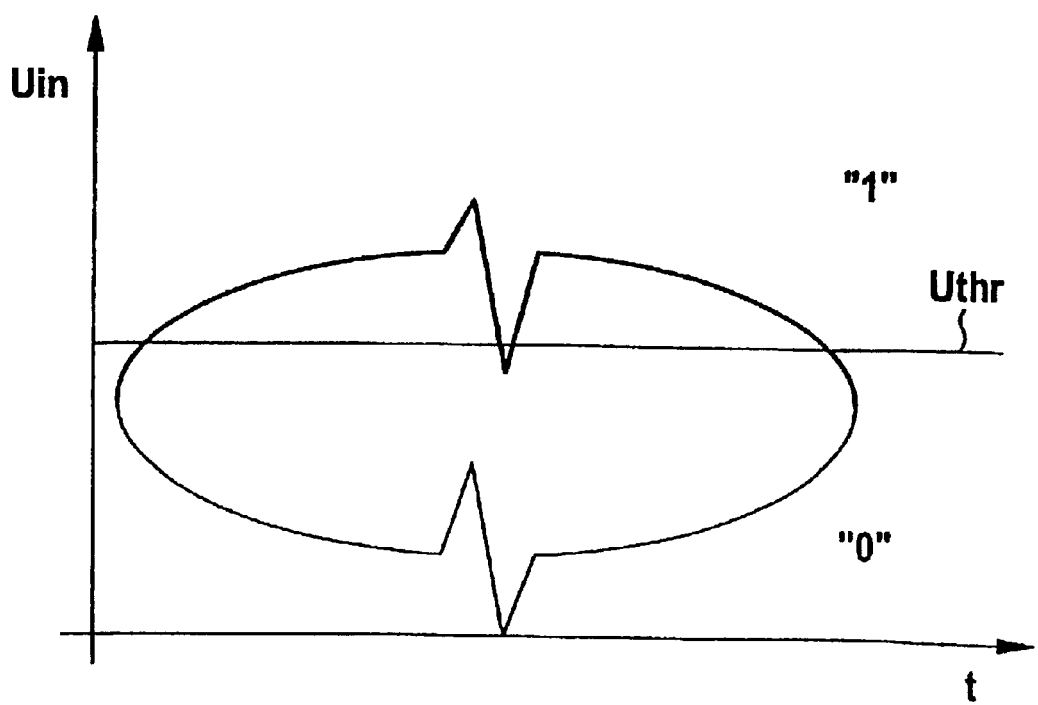

FIG. 2 shows a schematic eye diagram as described in the above prior art document. In FIG. 2, the input signal Uin is depicted over the time t. In the upper part of FIG. 2, the input signal Uin is a binary "1" and in the lower part, the input signal Uin is a binary "0". FIG. 2 also shows a threshold Uthr. If this threshold Uthr is about in the middle of the eye diagram, then it may be used to decide whether the input signal Uin is a binary "1" or a binary "0".

According to FIG. 1, the input signal Uin is forwarded to a first decision circuit 11 which is provided with an optimum threshold Uopt. This optimum threshold Uopt is located about in the middle of the eye diagram as described above. The first decision circuit 11 is therefore used to recover the received bits of the input signal Uin by deciding whether a binary "1" or a binary "0" was received. These recovered bits are provided by the first decision circuit 11 as an output signal Uout.

According to FIG. 1, the input signal Uin is also forwarded to a second decision ciruit 12 which is provided with a variable threshold Uvar. If the variable threshold Uvar is about in the middle of the eye diagram, then the decision of the second decision circuit 12 is probably correct. The varibale threshold Uvar is permanently increased and decreased. If the variable threshold is at one of the edges of the eye diagram, then the decisions of the second decision circuit 12 probably become incorrect. All decisions of the second decision circuit 12 are provided as an output signal Uincorr.

According to FIG. 1, the output signal Uout of the first decision circuit 11 and the output signal Uincorr of the second decision circuit 12 are provided to an EXOR circuit 13. If both output signal Uout and Uincorr are identical, then the output signal of the EXOR circuit 13 is "0". However, in any other case, i.e. if the two output signals Uout and Uincorr are not identical, the output signal of the EXOR circuit 13 is "1".

According to FIG. 1, this output signal of the EXOR circuit 13 is integrated by an integrator 14 which provides an output signal Ueye.

As the output signal Uincorr of the second decision circuit 12 probably becomes incorrect at the edges of the eye diagram, the output signal or the EXOR circuit 13 probably becomes "1" at these edges. This has the consequence that the output signal Ueye of the integrator 14 increases at the edges of the eye diagram. Due to this change of the output signal Ueye, it is possible to recognize and characterize the edges of the eye diagram and to calculate a so-called eye opening.

It has to be added that the two decision circuits 11, 12 are provided with a clocking signal C which corresponds to the bit rate of the input signal Uin, wherein the eye monitor 10 as described above and as disclosed in the cited prior art document works with a bit rate of up to 10 Gbit/s.

The described eye monitor of FIG. 1 has the disadvantage that the EXOR circuit 13 is not able to follow bit rates above 10 Gbit/s. As a consequence, the eye monitor 10 cannot be used for a bit rate of e.g. 40 Gbit/s.

It is an object of the invention to provide an eye monitor which allows to recognize and characterize the edges of the eye diagram at bit rates which are greater than 10 Gbit/s, e.g. at a bit rate of 40 Gbit/s.

According to the invention, this object is solved by an eye monitor for evaluating a binary input signal of a transmission link and for recognizing the edges of an eye diagram of the input signal, comprising a decision circuit which is directly connected to an integrator, wherein the input signal and a variable threshold are provided to the decision circuit and wherein an output signal of the integrator is used to recognize the edges of the eye diagram.

The eye monitor of the invention does not comprise an EXOR circuit. Any bit rate restriction due to the EXOR circuit is therefore overcome. As a result, the eye monitor of the invention has the advantage that it can be used for bit rates which are greater than 10 Gbit/s, e.g. at a bit rate of 40 Gbit/s. This advantage is reached without any further electrical circuits or the like.

In an advantageous embodiment of the invention, the output signal provides at least one second value if the variable threshold is in an upper and/or a lower part of the eye diagram. This second value may then be used to characterize the eye diagram of the input signal and in particular the edges of the eye diagram. In a further particular embodiment, an eye opening is evaluated based on the second value.

Further embodiments as well as further advantages of the invention are outlined in the following description of the following figures.

Figure 3:
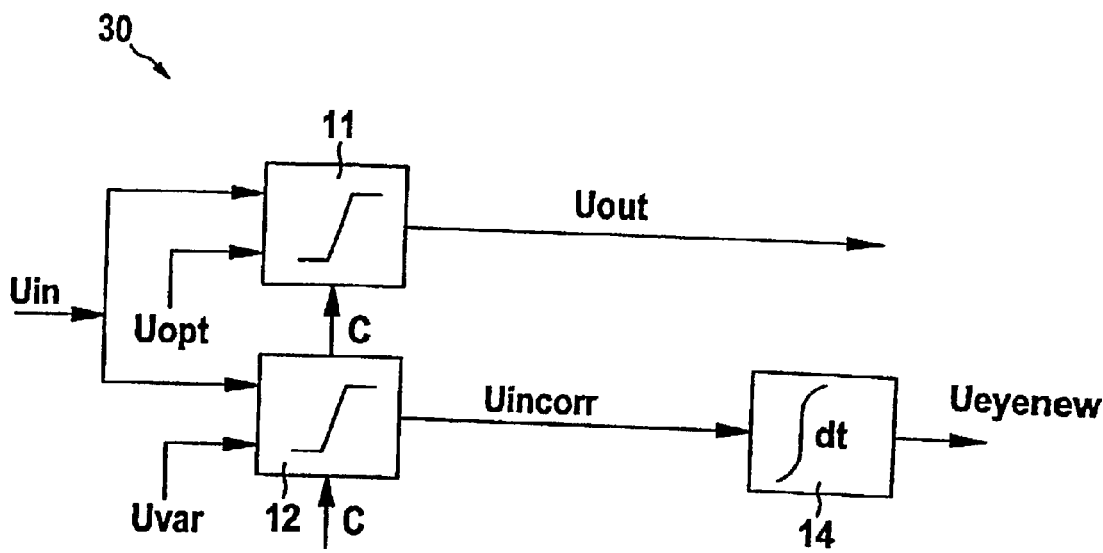
Figure 4:
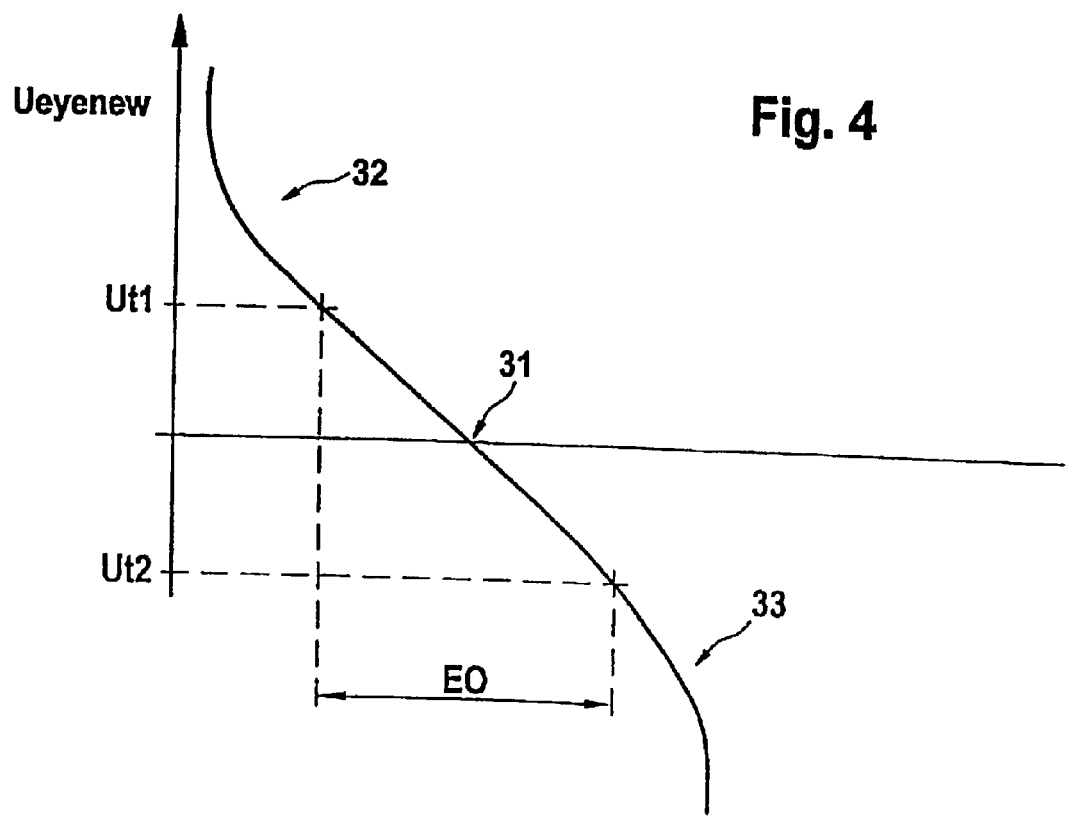

FIG. 3 shows a schematic block diagram of an embodiment of an eye monitor according to the invention, and FIG. 4 shows a schematic diagram of an output signal provided by the eye monitor of FIG. 3.

FIG. 3 shows an eye monitor 30 according to the invention. The eye monitor 30 is similar to the eye monitor 10 of FIG. 1. Therefore, corresponding circuits and signals have the same reference numerals and abbreviations in both figures.

The difference between the eye monitor 30 of FIG. 3 and the eye monitor 10 of FIG. 1 is the fact that the eye montor 30 of FIG. 3 does not comprise the EXOR circuit 13 of the eye monitor 10 of FIG. 1. Instead, the second decision circuit 12 is directly connected to the integrator 14 so that the output signal Uincorr of the second decision circuit 12 is directly forwarded into the integrator 14.

The integrator 14 then integrates this output signal Uincorr and provides an output signal Ueyenew as shown in FIG. 4.

As described, the varibale threshold Uvar is permanently increased and decreased.

If the varibale threshold Uvar is about in the middle of the eye diagram, then the output signal Uincorr is probably correct. Based on the assumption that the number of binary "1"-s and binary "0"-s of the succeeding bits of the input signal Uin is almost the same, the integrator 14 provides an output signal Ueyenew which as about Zero. This value is depicted with reference numeral 31 in FIG. 4.

If the variable threshold value Uvar is e.g. in the upper part of the eye diagram, then it is probable that the second decision signal 12 decides a bit of the input signal Uin to be a binary "0" whereas it is actually a binary "1". As a consequence, the number of bits which are decided to be "0"-s becomes greater than the number of decided "1"-s. This results in an increase of the output signal Ueyenew of the integrator 14. This increase is depicted with reference numeral 32 in FIG. 4.

If the variable threshold value Uvar is in the lower part of the eye diagram, then the situation changes into the opposite. This leads to a decrease of the output signal Ueyenew which is depicted with reference numeral 33 in FIG. 4.

According to FIG. 4, two threshold values Ut1 and Ut2 are provided which are symmetrical to Zero. From the crosspoints of the output signal Ueyenew with these threshold values Ut1, Ut2, an eye opening EO may be evaluated. This eye opening characterizes the eye diagram of the input signal Uin and in particular the edges of this eye diagram.

If the quality of the transmission becomes worse, then the eye diagram of the input signal Uin becomes smaller in the sense of a smaller distance between the upper and the lower edge of the eye diagram. This becomes apparent in the output signal Ueyenew of the eye monitor 30 of FIG. 3 in that the output signal Ueyenew becomes more flat and the eye opening EO becomes smaller.

However, if the quality of the transmission is very good, then the output signal Ueyenew becomes more sharp in the sense of a binary course with the consequence that the eye opening EO becomes greater.

What is claimed is:

1. Eye monitor for evaluating a binary input signal of a transmission link and for recognizing the edges of an eye diagram of the input signal, comprising a decision circuit which is directly connected to an integrator, wherein the input signal and a variable threshold are provided to the decision circuit and wherein an output signal of the integrator is used to recognize the edges of the eye diagram.

2. Eye monitor of claim 1 wherein the output signal provides a first value if the variable threshold is about in the middle of the eye diagram.

3. Eye monitor of claim 1 wherein the output signal provides at least one second value if the variable threshold is in an upper and/or a lower part of the eye diagram.

4. Eye monitor of claim 3 wherein the second value is used to characterize the eye diagram of the input signal and in particular the edges of the eye diagram.

5. Eye monitor of claim 4 wherein an eye opening is evaluated based on the second value.

6. Receiver of a transmission system comprising an eye monitor for evaluating a binary input signal of a transmission link and for recognizing the edges of an eye diagram of the input signal, the eye monitor comprising a decision circuit which is directly connected to an integrator, wherein the input signal and a variable threshold are provided to the decision circuit and wherein an output signal of the integrator is used to recognize the edges of the eye diagram.

7. Method of evaluating a binary input signal of a transmission link and of recognizing the edges of an eye diagram of the input signal, wherein a decision circuit is directly connected to an integrator, and comprising the steps of providing the input signal and a variable threshold to the decision circuit and using an output signal of the integrator to recognize the edges of the eye diagram.

* * * * *